United States Patent

Schulz et al.

Patent Number: 5,957,804
Date of Patent: Sep. 28, 1999

[54] PLANETARY GEAR

[75] Inventors: Horst Schulz, Friedrichshafen; Bernd Somschor, Tettnang, both of Germany

[73] Assignee: ZF Friedrichshafen AG, Friedrichshafen, Germany

[21] Appl. No.: 08/973,879

[22] PCT Filed: Jul. 10, 1996

[86] PCT No.: PCT/EP96/03005

§ 371 Date: Dec. 17, 1997

§ 102(e) Date: Dec. 17, 1997

[87] PCT Pub. No.: WO97/04249

PCT Pub. Date: Feb. 6, 1997

[30] Foreign Application Priority Data

Jul. 15, 1995 [DE] Germany .......................... 195 25 831

[51] Int. Cl.[6] .................................................. F16H 57/08
[52] U.S. Cl. .......................... 475/331; 475/342; 475/344
[58] Field of Search .................................. 475/331, 344, 475/336, 334, 342

[56] References Cited

U.S. PATENT DOCUMENTS

| | | |
|---|---|---|
| 1,499,763 | 7/1924 | Davis . |
| 3,333,482 | 8/1967 | Wildhaber .............................. 475/344 X |
| 4,043,226 | 8/1977 | Buuck .................................. 475/331 X |
| 4,106,366 | 8/1978 | Altenbokum et al. . |
| 4,157,635 | 6/1979 | Ward ..................................... 51/95 LH |
| 4,280,376 | 7/1981 | Rosen .................................. 475/344 X |
| 4,287,790 | 9/1981 | Fujiwara et al. ..................... 475/344 X |
| 5,083,988 | 1/1992 | Kobayashi et al. ................ 475/344 X |
| 5,242,336 | 9/1993 | Hori . |

FOREIGN PATENT DOCUMENTS

| | | |
|---|---|---|
| 0 627 575 A1 | 12/1994 | European Pat. Off. . |
| WO95/04232 | 2/1995 | WIPO . |

*Primary Examiner*—Charles A Marmor
*Assistant Examiner*—Roger Pang
*Attorney, Agent, or Firm*—Davis and Bujold

[57] ABSTRACT

A planetary gear (1) in the form of a Wolfrom gear with a high transmission ratio. Such gears are preferentially used in handling gear engineering. In order to reduce the number of components required and improve the overall efficiency of the planetary gear, the step wheels (4, 6) of the step planet wheels (5) or the hollow wheels (11, 12) are conically toothed and have opposite conical inclinations. The planet carrier (10) is floating, that is, without a separate bearing. The planetary gear is used especially in industrial robots.

18 Claims, 1 Drawing Sheet

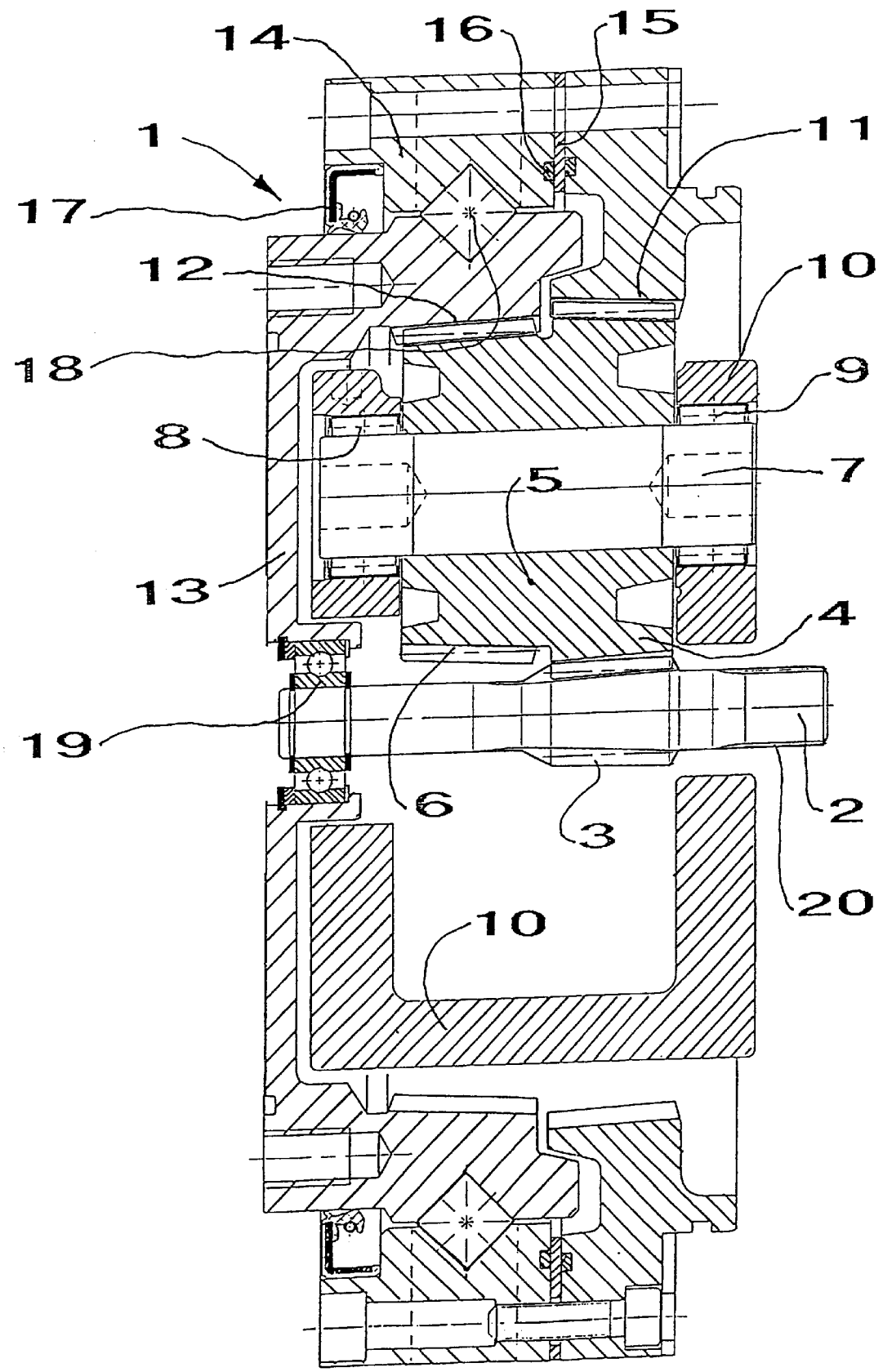

PLANETARY GEAR

The invention relates to a planetary gear having a driven sun wheel, two internally toothed hollow wheels of which one is fixedly mounted and the other is rotatably mounted and forms the output. Several planetary wheels are provided which are mounted upon planet axles of a planet carrier. The planetary wheels are in permanent tooth contact with the sun wheel and the hollow wheels.

Many tasks in the transmission technology require the obtention of extreme transmission ratios. Planetary gears are especially well suited to combine high transmission ratios with a compact design. The Wolfrom coupling gear, which with a high transmission ratio still has good efficiency, constitutes such a planetary gear. The Wolfrom gear is designed as a specially simple coupling gear. The input is connected with a sun wheel which interacts with a planetary wheel block. The planetary wheel rests on the internally toothed hollow wheel which is fixed to the housing. A web runs along idly as a planet carrier. The motion is passed on via the planet carrier and the planetary wheel(s) (step planet). The planetary wheel, for its part, meshes again with an internally toothed hollow wheel which forms the output. The arrangement described is adequate for a compact design which, in a narrow space, makes high transmission densities possible (see Klein: Theoretical Principles for the Design of Wolfrom Coupling Gears, in Maschinenmarkt 1982, pages 341 to 344).

It is especially in handling engineering that, for power transmission of high-speed prime movers, strongly reducing gears are needed. A case of utilization is constituted by industrial robots in which planetary gears are used. Primary importance is attached to the planetary gear for the precision of an industrial robot. Precise motion sequences, with the highest repetitive accuracy, must be ensured. For such a planetary gear the following criteria are of special importance: small, adjustable torsional play, great rigidity, high efficiency, low heat development, slight vibration and a high noise level. The overall efficiency is also a decisive criterion for the fitness of the planetary gear. Locked-up stresses have a serious effect upon the overall efficiency due to the elevated inner rolling activity that results.

U.S. Pat. No. 4,106,366 has disclosed a planetary gear where an internally toothed hollow wheel is pressed upon the conically made planet wheels by means of compression springs. On account of the elevated tooth rolling activity, due to locked-up stresses, the overall efficiency is inadmissibly reduced here.

A planetary gear with planet wheels which have a continuous straight toothing is also known from U.S. Pat. No. 5,242,336. The disadvantage of this gear is that a relatively large contact-free axial intermediate space is required between both of the hollow wheels in order to compensate for the relatively great difference in the number of teeth of the two hollow wheels without extreme distortions of the contact ratios. Also said axial intermediate space naturally increases the axial length of the gear and reduces the rigidity thereof. Of considerable disadvantage is also the increase in drag torque since the planets and the planet carrier clearly become heavier due to said intermediate space. The dynamic properties of this drive are impaired by said construction, especially when the planet wheels and the planet carrier rotate at high speeds. Were it desired to eliminate said axial intermediate space, then considerable distortions of the contact ratios would be inevitable. Extreme values in the addendum modification coefficient of the hollow wheels result in pointed tooth gaps in the hollow wheels which also have an unfavorable effect upon the toothed tools. In addition, extreme values in the working pressure angle would cause noise, friction torque and abrasion problems.

From European patent application 0 627 575 has become known a Wolfrom planetary gear in which the planet wheels are distributed axially in two differently toothed areas. The pitch diameter of both toothed areas can be equal or unequal. The axial forces occurring in both areas should be substantially reciprocally canceled by opposite helical cut toothings. Examining the tooth forces that appear, it is determined that the axial forces that appear are not reciprocally canceled but add up to a resultant.

In the planetary gear according to international patent application WP 95/04232, the planet wheels likewise have a continuous toothing. The advantage of this arrangement consists particularly in that the hollow wheels can be directly disposed consecutively in an axial direction. This ensures a great rigidity of the gear although the difference in the number of teeth of both hollow wheels must be small. Due to the toothing with continuously constant profile of the tooth flanks on the planets, compromises must be made in the reciprocal coordination with the toothings of both hollow wheels.

Finally, a gear in which the transmission ratio obtainable is to be extraordinarily high has become known from U.S. Pat. No. 1,499,763. For this purpose, it is proposed that the planets be equipped with two pinions of the same pitch diameter, a different number of teeth and different modules. In this gear, the toothed regions of the step planets have a cylindrical design. The axles of the step planets are inclined toward the middle axle of the gear in order to adapt the cylindrical toothed regions to the conically toothed hollow wheels. The radially inclined axles of the step planets effect an axial thrust, upon the planet carrier, which is absorbed by adequate bearings. Said bearings, besides causing additional expense, increase the installation space and the weight. In the case of large bearing dimensions, the no-load friction is additionally increased. Since the inclined axles of the step planets intersect with the middle axle of the gear forming an angle, a flank contact with a point contact results even under favorable conditions. This is no optimal condition for the development of noise, load capacity and correct contact ratios of a gear.

Departing from the above explained prior art, the problem to be solved by the invention is to provide a planetary gear having a small number of parts, a high load capacity and a smooth running and a small development of noise. The friction losses and the drag torque are to be reduced and the costs of production and assembly are to be lowered.

This problem is solved with a planetary gear according to the preamble of the main claim and with its characteristics.

Preferred structural embodiments are to be understood from subclaims 2 to 17.

Other features essential to the invention and the advantages resulting therefrom are to be understood from the description of an embodiment that follows.

In the planetary gear 1, shown in longitudinal section, a high-speed rotating input shaft 2 actuates a sun wheel 3 (a small central wheel). The sun wheel 3 and the input shaft 2 are preferably made as one piece.

The sun wheel 3 is in constant meshing connection with large step wheels 4 of several step planets 5. Each step planet 5 is completed by a small step wheel 6. One of the step planets 5 is reproduced in the drawing. Three step planets 5 are preferably provided.

One axle 7 is rotatably mounted on a planet carrier 10 over each bearing 8 and 9, preferably needle bearings. The axle 7 extends parallel to the input shaft 2. Each step planet 5, with its axle 7, is non-rotatably and fixedly mounted in an axial direction. But the step planet and the axle thereof are situated in the bearings 8 and 9 and axially movably relative to the planet carrier 10.

The large step wheels 4 of the step planets 5 are in constant meshing connection with a first hollow wheel 11. At the same time, they are in constant contact with a second hollow wheel 12 via the small step wheels 6.

The planet carrier 10 has no direct connecting shaft so that no torque is delivered or removed. Accordingly, it runs along idly. It is essential that the planet carrier 10 be not specially supported radially by a separate bearing.

The first hollow wheel 11 is fixedly disposed while the second hollow wheel 12 is firmly connected with an output flange 13. It can be seen from the drawing that the second hollow wheel 12 and the output flange 13 are made as one piece.

An annular housing 14 is firmly connected with the first hollow wheel 11 by fastening elements (not shown). Screw connections, for example, are adequate for this. A spacer disc 15 is inserted between connecting faces of the first hollow wheel 11 and of the annular housing 14. Provision is also made by adequate seals, such as O-rings 16, for a tight connection between the spacer disc 15 and the first hollow wheel 11 and the annular housing 14.

In order to protect the planetary gear 1 against external influences, a seal, preferably a radial shaft sealing ring 17, is inserted between the housing 14 and the output flange 13.

The second hollow wheel 12 and thus also the output flange 13 are rotatably mounted on the annular housing 14 and fixed in an axial direction, via a single roller bearing, which is preferably designed as a cross roller bearing. Instead of the cross roller bearing, other structural shapes are available for the skilled person. The second hollow wheel 12 and the output flange 13, for example, could be supported on the annular housing 14 by respective grooved ball bearings.

The input shaft 2 and the sun wheel 3 are respectively mounted over a roller bearing 19 on one of the two hollow wheels 11 and 12. In the embodiment shown, the support is effected on the output flange 13 or on the second hollow wheel 12. The opposite end of the input shaft 2 is provided with engaging gears 20 through which the driving is effected, for example, by an electromotor.

It has already been mentioned, at the beginning, that the planetary carrier 10 has no direct connecting shafts and accordingly runs idly along and also is not mounted over separate bearings. This peculiarity is to be traced to the construction, according to the invention, which particularly stands out by the following features:

Step planet 5:

The toothings of the step wheels 4 and 6 of step planet 5 extend conically. In addition, the toothings preferably have a helical cut. Each one of the toothings of the step wheels 4 and 6 are of equal pitch, that is, the toothing with the larger diameter has a larger helix angle.

The cone directions of the toothings of the step wheels 4 and 6 are selected opposite to one another, as is to be understood from the drawing.

Considerable advantages from the point of view of cost result if the toothings of the step wheels 4 and 6, respectively, have the same number of teeth. Thus a very simple assembly sequence also results, since it is not required that a specific tooth of the step wheels is mounted in a specific tooth gap of a hollow wheel 11 or 12. Also during production of the toothings, no specific coordination of position has to be taken into account as long as the coordination of the position for all step planets 5 of a gear is the same. As a result of this, production and assembly costs are lowered.

Favorable efficiency as a—tight—gear that remains uniform over a long period of operation can be obtained if the respective toothings of the step wheels 4 and 6 and the hollow wheels 11 and 12 have different modules. The differences in the modules are selected so as to produce approximately equal pressure angles. Small pressure angles which cause unfavorable friction ratios or too large pressure angles, which lead to an unfavorable running behavior or the development of noise, are thus prevented.

Small manufacturing tolerances of the step planets can be mutually compensated, since the step planets are mounted with axial play in the planet carrier. Each step planet itself can run in its own ideal track, in an axial direction, in which the play of the toothings can be almost equally distributed between the step wheels and the hollow wheels in contact with them. This particularly applies also under the effect of elastic distortions of the parts and also of other factors which affect the toothing play. This also represents an easier assembly of the gear. A uniform distribution of the toothing play does not have to be produced by an expensive adjustment operation.

Hollow wheels 11 and 12:

The toothings of the hollow wheels 11 and 12 likewise extend conically and are preferably designed with a helical cut. It also applies to the hollow wheels 11 and 12 that their toothings have the same pitch so that the toothing, having the larger diameter, has the larger helix angle.

The opposite cone direction of the toothings of the hollow wheels 11 and 12 makes it possible to direct the axial forces resulting from the tooth contacts of the two hollow wheels against each other and thus almost to remove their effect. The step wheels 4 and 6 of the step planets 5 are kept in their optimal position by the axial guiding forces of both conically toothed hollow wheels 11 and 12.

It is advantageous that the difference in the number of teeth of the hollow wheels 11 and 12 be twice as great as the number of step planets 5. By this design, the friction losses, the toothing velocities, the speeds of the rotating parts and the drag torques can be reduced for the internal gear rolling activities. In this case then a certain partial transmission ratio, expressed by the ratio of the speed of the planet carrier 10 to the speed of the output flanges 13, is of course correspondingly less. This would first, on its own, decrease the overall transmission ratio of the gear if it cannot be increased by other means, which often is the case. To said means belong, for example, a smaller number of teeth of the sun wheel and/or a larger number of teeth on both of the hollow wheels 11 and 12. In general, a softer gear with a great total efficiency is obtained with a sufficient overall transmission ratio.

Planet carrier 10:

A special guide bearing for the planet carrier 10 is eliminated. Hereby, in addition to eliminating an expensive part, no eccentricities are transmitted by the bearing or the bearing seat to the toothings. By eliminating the redundancy that exists in case of a separate bearing for the planet carrier, an additional degree of freedom is obtained. Pressure points are eliminated. This represents a great advantage in the case of tight backlashes and misalignments caused by distortions, since the ideal center can be said to have been found. The no-load impedance of the gearing is naturally eliminated. The drag torque is reduced. Each step planet 5 can center itself and all three step planets, in turn, carry along the planet carrier. The planet carrier can freely adjust itself axially relative to the hollow wheels 11 and 12 via the step planets mount on it with axial play.

Spacer disc 15:

The spacer disc 15—combined with the oppositely directed conical toothings of the hollow wheels 11 and 12—offers a possibility of adjustment at reasonable cost but very effective for the tooth backlash of the toothings of the step planets 5 in relation to the toothings of the hollow wheels 11 and 12. The thickness of the spacer disc 15 can be adapted to each individual gear according to the established production dimension of the gearwheels involved and to the backlash desired. The desired backlash can be light play or also moderate prestress. The overall play adjusted by the spacer disc 15 is automatically distributed between both hollow wheel contacts, since the axial forces can be adjustably controlled by selecting a suitable angle of inclination of the cone and can be held in balance.

It should be taken into consideration, especially in the case of a tight adjustment of play, that the angle of inclination of the cone in each hollow wheel 11 or 12—measured in the contact zone of the backlash—amounts to at least 20% of the pitch of the helix angle of the hollow wheel involved. Thus, undesired instabilities of the friction, that occurs by the interaction of angle of inclination of the cone and the helix angle, can be prevented. In each case, it is ensured that the gear cannot automatically stall.

The following applies to the embodiment of a planetary gear, according to the invention, that is reproduced in the drawing:

| Hollow wheel 12: | |
| --- | --- |
| number of teeth | 109 |
| module | 1.96 |
| helix angle | 10°8'52" right |
| angle of inclination of cone | 30° |
| Hollow wheel 11: | |
| number of teeth | 103 |
| module | 2.14 |
| helix angle | 11°5'30" right |
| angle of inclination of cone | 3° |
| Step planet 5: | |
| number of teeth of step wheels 4 and 6 | 46 each |
| Sun wheel 3: | |
| number of teeth | 11 |

The planet carrier 10 can also be driven by a similar wheel arrangement or train instead of the sun wheel 3. This delivers a similar input gear ratio. The drive, for example, can be effected by a stepped bevel gear. It is, likewise, possible to exchange the input and the output whereby the direction of rotation reverses itself. The numeric value of the overall transmission ratio then changes slightly.

The step planets 5 can be produced by a process in which the toothings of the step wheels 4 and 6 are first produced by splicing. After hardening (case hardening), further processing by a hard splicing can follow. The toothing is finally completed by honing.

In another method of production of the step planets, the step wheels 4 and 6 are separately produced. The toothing is completed in the above described manner. Following this, the step wheels 4 and 6 can be mutually aligned and welded together.

| Reference numerals | |
| --- | --- |
| 1 | planetary gear |
| 2 | input shaft |
| 3 | sun wheel |
| 4 | step wheel |
| 5 | step planet |
| 6 | step wheel |
| 7 | axle |
| 8 | bearing |
| 9 | bearing |
| 10 | planet carrier |
| 11 | hollow wheel |
| 12 | hollow wheel |
| 13 | output flange |
| 14 | housing |
| 15 | spacer disc |
| 16 | O-ring |
| 17 | radial shaft seal |
| 18 | cross roller bearing |
| 19 | ball bearing |
| 20 | engaging gears |

We claim:

1. A planetary gear set having a first hollow gear (11) and a second hollow gear (12) each having an internal inwardly facing toothed portion, said first hollow gear (11) being fixedly mounted to prevent rotation thereof and said second hollow gear (12) being rotatably mounted, relative to said first hollow gear (11), and forming an output of said planetary gear set, and a plurality of step planets (5) each being mounted on a planetary carrier (10) so at to be in permanent meshing contact with both of said first and second hollow gears (11,12);

wherein the tooth portion of said first hollow gear (11) is an inclined conical toothed portion and the tooth portion of said second hollow gear (12) is an inclined conical toothed portion, and the inclined conical toothed portion of said second hollow gear (12) is inclined in an opposite direction to the inclination of the inclined conical toothed portion of said first hollow gear (11); and each of said plurality of step planets (5) has a first inclined tooth gear portion (4) and a second inclined tooth gear portion (6), and an angle of inclination of the first inclined tooth gear portion (4) is inclined in an opposite direction to an angle of inclination of said second inclined tooth gear portion (6), and said first inclined tooth gear portion (4) mates with said inclined conical toothed portion of said first hollow gear (11) and said second inclined tooth gear portion (6) mates with said inclined conical toothed portion of said second hollow gear (12).

2. The planetary gear set according to claim 1, wherein each of said plurality of step planets (5) are mounted with axial play on said planet carrier (10).

3. The planetary gear set according to claim 1, wherein said planet carrier (10) is idly mounted relative to both said first and second hollow gears (11, 12).

4. The planetary gear set according to claim 1, wherein said inclined conical toothed portions of said first and second hollow gears (11, 12) are inclined so that axial forces resulting from a tooth contact between said first inclined tooth gear portion (4) and said inclined conical toothed portion of said first hollow gear (11), and a tooth contact between said second inclined tooth gear portion (6) and said inclined conical toothed portion of said second hollow gear (12) are oppositely directed and are of substantially of the same magnitude.

5. The planetary gear set according to claim 1, wherein said inclined conical toothed portion of said first hollow gear (11), said inclined conical toothed portion of said second hollow gear (12), and said plurality of step planets (5) all have a conical and helical cut teeth designs.

6. The planetary gear set according to claim 1, wherein said first inclined tooth gear portion (4) and said second inclined tooth portion (6), of each of said plurality of step gears (5), both have the same number of teeth.

7. The planetary gear set according to claim 1, wherein said inclined conical toothed portions of both said first and second hollow gears (11, 12) have a different module from said first and second inclined tooth gear portions (4, 6) of each of said plurality of step planets (5).

8. The planetary gear set according to claim 1, wherein a spacer disc (15) is located between said first hollow gear (11) and said second hollow gear (12) to axially space said first and second hollow gears from one another.

9. The planetary gear set according to claim 1, wherein said inclined conical toothed portions of said first and second hollow gears (11, 12) are helical and the angle of inclination of each tooth of said inclined conical toothed portions of said first and second hollow gears (11, 12), measured at a contact zone of a flank of the tooth, amounts to at least 20% of a pitch circle helix angle of the respective hollow gear (11, 12).

10. The planetary gear set according to claim 1, wherein said planetary gear set has an input shaft (2) and a sun gear (3) is made unitary with the input shaft (2) of said planetary gear set.

11. The planetary gear set according to claim 5, wherein said helical cut teeth have the same direction and substantially the same pitch.

12. The planetary gear set according to claim 7, wherein said teeth of said first and second hollow gears (11, 12) and said teeth of said first and second inclined tooth gear portions (4, 6) have different modules which are selected so as to produce, during operation, approximately equal and opposite pressure angles.

13. The planetary gear set according to claim 1, wherein said first and second hollow gears (11, 12) have a different number of teeth and the different number of teeth is equal to twice the number of said step planets (5).

14. The planetary gear set according to claim 1, wherein said planetary gear set has an input shaft (2) and each planet carrier axle (7) extends parallel to said input shaft (2).

15. The planetary gear set according to claim 1, wherein said teeth of said first and second inclined tooth gear portions (4, 6) are formed by a splicing, a case hardening, a subsequent hard splicing and a final honing manufacturing process.

16. The planetary gear set according to claim 1, wherein said step planets (5) are manufactured by separately producing first and second inclined gear portions (4, 6), producing a tooth on said first and second inclined gear portions (4, 6), aligning said first and second inclined tooth gear portions (4, 6) relative to one another and finally splicing by welding.

17. The planetary gear set according to claim 1, wherein said planet carrier (10) is driven by a gear arrangement.

18. The planetary gear set according to claim 1, wherein a sun gear (3) supplies a drive input to said planetary gear set and said sun gear (3) is in permanent tooth contact with said first inclined tooth gear portion (4).

* * * * *